(12) United States Patent
Muehlberger et al.

(10) Patent No.: US 10,882,701 B2
(45) Date of Patent: Jan. 5, 2021

(54) METHOD AND APPARATUS FOR DETECTING FAULTS DURING OBJECT TRANSPORT

(71) Applicant: KRONES AG, Neutraubling (DE)

(72) Inventors: Martin Muehlberger, Koessen (AT); Josef Paukert, Kolbermoor (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/468,371

(22) PCT Filed: Dec. 11, 2017

(86) PCT No.: PCT/EP2017/082160
§ 371 (c)(1),
(2) Date: Jun. 11, 2019

(87) PCT Pub. No.: WO2018/108782
PCT Pub. Date: Jun. 21, 2018

(65) Prior Publication Data
US 2020/0189855 A1    Jun. 18, 2020

(30) Foreign Application Priority Data
Dec. 14, 2016 (DE) .......................... 10 2016 124 400

(51) Int. Cl.
*B65G 15/46* (2006.01)
*B65G 15/62* (2006.01)
*B65G 43/08* (2006.01)

(52) U.S. Cl.
CPC ...... *B65G 43/08* (2013.01); *B65G 2201/0244* (2013.01); *B65G 2203/0225* (2013.01); *B65G 2203/041* (2013.01)

(58) Field of Classification Search
CPC .................................. B65G 15/46; B65G 15/62
(Continued)

(56) References Cited

U.S. PATENT DOCUMENTS 6,002,125 A * 12/1999 Schubert ................ B25J 9/1697
    250/223 R
6,286,656 B1 * 9/2001 Huang ................... B65G 47/90
    198/418.9
(Continued)

FOREIGN PATENT DOCUMENTS

| CN | 101641280 A | 2/2010 |
| CN | 101710080 A | 5/2010 |

(Continued)

OTHER PUBLICATIONS

International Search Report for PCT/EP2017/082160 dated Mar. 27, 2018.
(Continued)

*Primary Examiner* — Douglas A Hess
(74) *Attorney, Agent, or Firm* — Schmeiser, Olsen & Watts, LLP

(57) ABSTRACT

Provided is a method for detecting faults in the context of transport of objects, wherein by a transport device, a plurality of objects are transported in a predetermined alignment of these objects along a predetermined transport path, wherein the objects are transported while at least partially in contact with each other, and wherein the objects are located on a movable surface of the transport device, wherein, by at least one image capturing device, at least one first region is captured in which a plurality of these containers is located and at least one sub-region of this region is identified in which no object is located in the predetermined orientation, wherein furthermore a distinction is then made as to whether an object with an alignment deviating from the predetermined alignment or an empty space is located in this region.

12 Claims, 1 Drawing Sheet

Figure 1:
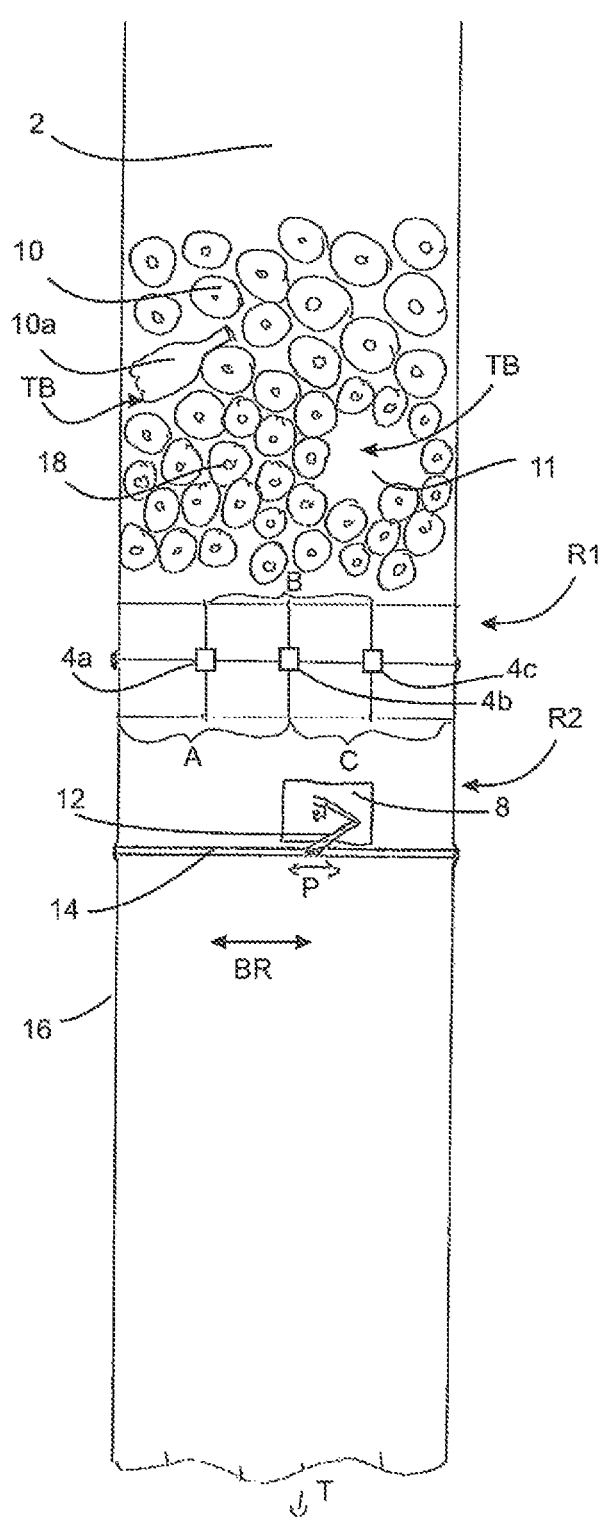

(58) Field of Classification Search
USPC .......................................... 198/502.2, 502.3
See application file for complete search history.

(56) References Cited

U.S. PATENT DOCUMENTS

| | | | | |
|---|---|---|---|---|
| 6,847,859 | B2* | 1/2005 | Nuebling | G01B 11/04 |
| | | | | 198/502.2 |
| 8,245,838 | B2* | 8/2012 | Reichenbach | B07C 3/14 |
| | | | | 198/502.1 |
| 8,704,674 | B2* | 4/2014 | Morand | B65G 43/08 |
| | | | | 198/502.1 |
| 8,966,864 | B2* | 3/2015 | Rabec | B65B 59/005 |
| | | | | 198/586 |
| 9,333,649 | B1* | 5/2016 | Bradski | B25J 9/1697 |
| 9,846,806 | B2* | 12/2017 | Mishra | G06K 9/00577 |
| 10,087,017 | B2* | 10/2018 | Klotz | B65G 47/256 |
| 10,399,793 | B2* | 9/2019 | Andreoli | B65G 45/18 |
| 10,486,915 | B2* | 11/2019 | Kim | B65G 47/1492 |
| 10,625,952 | B1* | 4/2020 | Luthra | B65G 43/08 |
| 10,656,276 | B2* | 5/2020 | Smith | G06F 3/011 |

| | | | |
|---|---|---|---|
| 2010/0082149 | A1 | 4/2010 | Till et al. |

FOREIGN PATENT DOCUMENTS

| | | |
|---|---|---|
| CN | 102020103 A | 4/2011 |
| CN | 102602693 A | 7/2012 |
| CN | 104743172 A | 7/2015 |
| DE | 102007014802 A1 | 10/2008 |
| DE | 102009043976 A1 | 3/2011 |
| DE | 102011009181 A1 | 7/2012 |
| EP | 2132129 A2 | 12/2009 |
| EP | 2295156 A2 | 3/2011 |
| WO | 2015185957 A1 | 12/2015 |
| WO | WO2015185957 A1 | 12/2015 |

OTHER PUBLICATIONS

International Search Report for PCT/EP2017/082160.
Chinese Office Action dated Jul. 2, 2020 for Application No. 201780776160.

* cited by examiner

METHOD AND APPARATUS FOR DETECTING FAULTS DURING OBJECT TRANSPORT

CROSS-REFERENCE TO RELATED APPLICATIONS

This application claims priority to PCT Application No. PCT/EP2017/082160, having a filing date of Dec. 11, 2017, based on German Application No. 10 2016 124 400.7, having a filing date of Dec. 14, 2016, the entire contents both of which are hereby incorporated by reference.

FIELD OF TECHNOLOGY

The following relates to a method and an apparatus for detecting faults during the transport of objects. From the known art and in particular in the beverage production industry the most varied transport devices are known. Thus, it is also known inter alia that objects—such as in particular containers—are conveyed on a conveyor belt or a transport chain. In this case a plurality of containers is usually positioned on this conveyor belt and are moved or transported thereby.

BACKGROUND

The following is described below with reference to transport of containers. Some of the embodiments of the invention are particularly suitable for such transport of containers. However, it is pointed out that embodiments of the invention can also be used in the transport of other objects—for example on conveyor belts or transport chains. During such container transport it may occur that, within a bulk supply of bottles, individual bottles fall over and thus no longer stand upright like the conventional bottles. The containers which have fallen over in such a mass transport system repeatedly cause faults in corresponding beverage production plants.

SUMMARY

An aspect relates to a method and an apparatus which simplify the detection of such sources of faults and which can also initiate corresponding countermeasures.

In addition, however, the aspect of the invention is to propose diagnostic options by which containers which have fallen over can already be identified in a transport region and where appropriate can be remedied.

In a method according to embodiments of the invention for detecting faults in the context of transport of objects, by means of a transport device a plurality of these objects can be transported in a predetermined alignment of these objects along a predetermined transport path, wherein the objects are transported while at least partially in contact with each other, and wherein the objects are located on a movable surface of the transport device.

According to embodiments of the invention, by means of at least one first image capturing device at least one first region is captured in which a plurality of the transported objects (for example containers) is located and at least one sub-region of this region is identified in which no object is located in the predetermined alignment. Furthermore, a distinction is made as to whether an object with an alignment deviating from the predetermined alignment or an empty space is located in this region. Within the context of the transport of objects described above, on the one hand it can occur that an object falls over and lies somewhat transversely in the bulk supply of objects. It can also occur that empty spaces form, in which no objects are present. Corresponding countermeasures must be introduced as a function of this fault. Thus, for example an object which has fallen over can be removed or even set upright. A corresponding empty space could for example be filled with additional objects.

The objects are advantageously containers and in particular plastic containers. They are advantageously containers which have an outer wall which are flexible at least in some sections, and therefore in particular plastic containers.

In a further preferred method at least one image capturing device is used, which enables a three-dimensional image evaluation and/or output of images with depth information (or corresponding imaging data). In addition, or alternatively an image evaluation device can be provided, which also outputs depth information on the basis of captured images, optionally using specific boundary conditions.

In particular, in order to make it possible to trace any containers which have fallen over, it is advantageous if an image capturing device not only outputs the usual two-dimensional information, but furthermore also information concerning the distance of the captured object from the image capturing device.

For this purpose, it would be possible for the penetration depth to be specified with reference to known distances. Thus, for instance the ratio of a distance of the image capturing device from the carrier belt can be set in relation to the container diameter. In this case a two-dimensional camera could be used, and corresponding distances or size ratios could be inferred from the image evaluation of this camera. For this purpose, a distance from the at least one image capturing device could also be variable, for example a measuring bridge on which the image capturing device is arranged could be adjustable in height.

However, an image capturing device is used which enables not only a two-dimensional resolution of a captured image but furthermore also outputs information about the distance of a captured object from the image capturing device. For this purpose, various methods and apparatus are known in the known art.

A 3D camera is used as an image capturing device. 3D cameras are camera systems which also allow a (pictorial) representation of distances of an image or an entire scene.

3D cameras are used on the one hand in order to give the observer a three-dimensional impression (in particular stereo systems). On the other hand, as in the case of embodiments of the present invention, they are used for the measurement or control/automation. Various systems can achieve 3D imaging of their surroundings.

The image capturing device is selected from a group of images capturing devices which includes stereo cameras, triangulation systems, TOF systems (which carry out transit time measurements), interferometry systems, image capturing devices which evaluate cast shadows, or image capturing devices with an additional or alternative ultrasonic measuring device.

When stereo cameras are used the surroundings are captured simultaneously by two cameras. The distance between the camera objectives corresponds for example to the distance between human eyes. The resulting pair of images can be transmitted separately to the eyes of the observer or an image evaluation. The images can also be processed in the evaluation unit and so the distance from objects can be measured.

When triangulation systems are used a light source images a defined pattern onto the object. An image capturing device and in particular a camera captures this pattern from a different viewing angle and from the distortion it calculates the distance.

So-called. TOF cameras or TOF (time off light) systems carry out transit time measurements of the light (e.g. individually for each pixel). In this way it is possible to infer a distance. An example of such a TOF image capturing device is a PMD sensor (photo mixing device, photo mixing detector).

Interferometric systems use the interferences between a measuring beam and an object beam. In this case very short wavelengths are preferably used. Due to these very short wavelengths the smallest distance resolutions can be achieved with such systems.

However, a detection device in the form of a volume scanner could also be provided. This volume scanner could be designed in particular as a laser scanner which at least detects the volume of an article in a sub-region of a space and in particular of a space above the transport plane. In this case a detection range of the detection device covers a width of the transport plane. In this case the width of the transport plane can be for example the width of a conveyor belt which transports the objects.

It is generally preferable if a detection range of the detection device lies perpendicularly above the transport plane. In this way in particular an undistorted capture of images is possible.

The objects are transported over a width direction of the transport device without walls located between them, that is to say not, as is conventional in the known art in some instances, in lanes which are separated from one another and extend in the transport direction. Therefore, with regard to the apparatus the transport device is designed free of walls and/or barriers in a direction extending perpendicularly to the transport direction and/or at least two containers are conveyed while in contact with one another in a direction perpendicularly to the transport direction. Therefore no single-row transport of the objects takes place through transport lanes.

In a further advantageous method at least one object is removed from the transport path or the transport stream by means of a fault elimination device. This fault elimination device can in particular be a robot device which is suitable for removing individual objects and in particular containers from the stream of objects or containers. This fault elimination device is selected from a group of fault elimination devices which includes robots with suction arms, tripods, movable arms, quadcopters and the like.

Alternatively, however, it would also be possible that in response to a detected fault a fault signal is output, and/or the relevant system is at least temporarily stopped (in particular by means of a machine stoppage).

This fault elimination device is controlled on the basis of data and/or information output by the image capturing device. By the use of an image capturing device as described above, which also outputs depth information, a fault elimination device such as for example a suction robot can be set more precisely to the required depth. In this case the robot device can have a simpler configuration, requiring for example a bellows which is not too long. It is also possible to control the point at which any container which has fallen over should be gripped.

This procedure can also be employed when glass bottles are used, for instance for detecting splinters or breakages of glass.

The image capturing device described here can also be used in order to detect topographies of the respective container. This can be helpful in order to control the fault elimination device appropriately. Thus, for example the fault elimination device can be controlled in a targeted manner so that for instance it does not grip a container in a mouth region in which a support ring is located. Thus, for instance the fault elimination device can be controlled in such a way that a suction cup or suction head is not placed on the horizontal support rings of the containers (whereby suction power would be lost). This in turn offers the advantage that the suction cup does not have to be designed to be so soft or sensitive.

Particularly the fault elimination device has a suction device which is suitable and intended for the suction of objects, in particular containers and in particular containers which are to be separated out.

The fault elimination device is controlled in such a way that it detects and/or captures the container in a region of the centre of gravity thereof. In this way the containers can be detected at relatively low effort. Only a relatively low negative pressure is necessary when a suction head is used.

In a further advantageous embodiment of the method the objects are transported in a rectilinear direction. Advantageously the transport device has a circulating transport element and particularly a circulating conveyor belt or a circulating transport chain. Advantageously a plurality of containers is also transported alongside one another in a direction perpendicular to the transport direction. The objects and in particular the containers are transported in a bulk supply or a stream of containers. The transported containers are containers which are already filled and/or already closed. A container is in contact via its peripheral wall with several further containers. The containers are transported in a disordered bulk supply, that is to say a bulk supply which has no predetermined geometric alignments between the individual containers.

In a further advantageous method, the fault is selected from a group of containers including containers which have fallen over or containers with incorrect alignment or also empty spaces in the stream of container. In particular in this case these are empty spaces which are larger than a cross-section of an individual container. In addition, however, other faults could also be detected, such as for instance burst containers.

The predetermined alignment of these containers is an upright alignment of the containers. This means that the containers are transported standing upright, that is to say in particular standing on the container base. The deviating alignment of the containers relates in particular to a container which has fallen over, that is to say a container of which the longitudinal direction is now parallel to the transport plane of the transport device. In an orderly transport of the containers the longitudinal direction of the containers is advantageously perpendicular to a transport plane of the transport device.

In a further preferred method several regions of the stream of containers are captured by means of a plurality of image capturing devices which are arranged one behind the other or adjacent to one another in a direction perpendicular to the transport direction. The image capturing devices are advantageously photo or video cameras. These can capture spatially resolved images of the respective regions. Due to the arrangement of these image capturing devices alongside one another, in principle the entire region of the transport device or the region beyond its complete width can be monitored. Advantageously, the stream of containers is completely monitored in this direction perpendicular to the transport direction. The observation regions of at least two of these image capturing devices overlap and particularly the observation regions of several image capturing devices overlap. In this way it can be ensured that the entire bulk supply of containers is monitored.

At least one of these image capturing devices is arranged stationary relative to the transport device. The above-mentioned image capturing devices are arranged stationary relative to the transport device. In particular at least one of the images capturing devices is arranged above the containers or above the transport path thereof. In this way the at least one image capturing device captures images of the bulk supply of containers from above. An illumination device is also provided which illuminates the bulk supply of containers, in particular to capture images by means of the image capturing device. In this case this illumination device is also arranged above the transport path of the containers.

In a further preferred method an identified fault is remedied. In this case it is preferable in particular to intervene in the stream of containers and either to remove a container from the stream of containers or to feed a container to the stream of containers.

In a further preferred method an incorrectly oriented container is removed from the stream of objects and/or an empty space is filled with at least one further object. Furthermore, it would also be possible that an incorrectly oriented object is oriented in a desired orientation, for example a container which has fallen over is set upright. In this case for example a gripper could be provided which alternatively picks up a container which has fallen over or inserts a container into a gap.

Thus, a sensor system—for example the above-mentioned image capturing device—can examine if a fault is present, for example a gap is present which has a minimum surface area of a container height multiplied by the container diameter. This is the area of the container which has fallen over in plan view. This can take place for example with the aid of an evaluation of bottle closures, as described in greater detail below. In a further preferred method at least one image capturing device is aligned with a surface of the transport device, for instance the conveyor belt. In this case for example a focusing on this conveyor belt can take place. Due to this focusing it is possible on the one hand to ascertain if there is a gap or an empty space in a region, since then the conveyor belt itself can be detected. It is also possible to detect a container which has fallen over in this region, since this is shown at least in part. In the case of correct transport, that is to say with a container standing upright, this container is located outside the focus of the image capturing device.

Thus, in any case it can be ascertained whether a container is present or has fallen over in the region of a gap.

In a further preferred method, by means of a second image capturing device which adjoins the first image capturing device in the transport direction of the containers it is checked whether an object with an alignment deviating from the predetermined alignment (for instance a container which has fallen over) or an empty space is located in this region. Here too it is again possible that the second image capturing device is aligned with the transport device or the conveyor belt itself.

Therefore in this case an at least two-stage method is proposed, in which first of all the occurrence of a specific fault is captured by means of a first image capturing device and the type of fault is determined by means of a second image capturing device which is arranged after the first image capturing device in the transport direction of the objects. In this case this second image capturing device can also serve the purpose of controlling a fault elimination device which should eliminate the relevant fault.

In a further preferred method, the second image capturing device is movable in a direction perpendicular to the transport direction. In this case it is possible that this second image capturing device can be shifted with respect to the stream of containers.

In a further preferred method, the sub-region is determined geometrically. This means that an image capturing device for example detects a sub-region in which no correctly aligned containers are present. This sub-region is now geometrically determined, for example with regard to its boundaries. In this way for example on the basis of a geometric shape of this sub-region it can be inferred whether a container or only a gap is located within this sub-region.

Thus, for instance, a longitudinal dimension of an empty space can be determined by a corresponding image evaluation. If this longitudinal dimension is less than the height of a container, it can be assumed that no container which has fallen over is located in this region.

This exact determination of the sub-region is forwarded to a control device so that a corresponding countermeasure can be implemented, for example a container can be removed from this sub-region or a container from this sub-region can be set upright again.

In addition, a control device can also send a signal to the transport device to stop. In this case during a shutdown of the transport device a container which has fallen over can be taken from the belt or can be set upright again. In addition, an alarm or a request to take a container which has fallen over from the transport device can be output to the machine operator.

In a further preferred method at least one image capturing device is suitable and intended for detecting specific characteristic elements of the containers, for example the container closures thereof. By means of the container closures it can be inferred that the containers are for example transported correctly on the transport device.

Therefore, in a preferred method the checking as to whether an empty space is present takes place by means of an evaluation of the container closures. If a region without discernible closures results, it can be inferred from this that a specific fault has occurred. This information can be passed on to a fine identification which then checks this region more precisely. Thus, within the context of this rough identification in this preferred method it cannot yet be ascertained whether there is a gap, that is to say a region where no container is present, or a container which has fallen over. The determination by means of the container closures only makes it possible to infer whether no container closures are present in a specific region.

If such a region without containers is identified, the region to be checked is transmitted to the above-mentioned second image capturing device, which is designed to be movable. This transmission can take place for example by a division into sub-regions. Advantageously, this transmission takes place immediately following the aforementioned rough identification, in order to avoid an uncontrolled fault propagation. The system moves to this region and considers exclusively this one in order to ascertain whether here there is actually a container which has fallen over or merely a gap. Thus, for example a sensor system can only check in the depth and no longer on the closure plane. If a container which has fallen over or is defective is detected, this can optionally be removed or set upright. In order to achieve this, a gripping device with an integrated camera device can be provided for example. The number of sensor systems or the evaluation range preferably depends upon the sensors and the width of the conveyor belt. In the following drawings three regions have been illustrated by way of example.

In a further possible configuration of the method with only one sensor system a distinction is made immediately as to whether a container which has fallen over, or a gap is present in the stream of containers. In this case the system is aligned with and/or focused on the transport device or the conveyor belt. If a gap is identified, this can be ignored or can also be filled by means of a subsequent system. Containers which have fallen over or are defective are removed or set upright by means of a subsequent system. In this case it would be possible and preferable that the image capturing device has a focusing device and in particular an autofocusing device. In addition, it would also be possible to use as an image capturing device a 3D camera which also outputs information about distances of the objects to be captured from the image capturing device. Thus, as mentioned above, the image capturing device could in particular have a transit time measuring device.

For this purpose, a precise data transmission, that is to say with regard to the position and alignment of the sensor system or the image capturing device with the subsequent system, is carried out. A distance between the image capturing device and subsequently for example the gripper system is kept as small as technically possible, in order to avoid fault propagation and in order to facilitate exact gripping in the container. In this case it is possible and preferable that imaging data are also output with a time parameter which provides information about when the respective image was captured.

In this way it can be determined where a specific fault, for example a container which has fallen over or an empty space, is located at any later time, so that a fault can also be eliminated at a later time. The transport device has, at least partially, a constant width. In this way faults which occur move uniformly with the containers and are not shifted for instance by a change on the width of the transport device.

Furthermore, embodiments of the present invention relate to an apparatus for capturing faults in the context of a transport of objects with a circulating transport device which has a transport surface on which the objects to be transported can be transported in a predetermined orientation, rectilinearly in a predetermined transport direction. In this case this transport device has a width which is determined in such a way that the objects are transported at least partially in a direction perpendicular to the transport direction and at least partially in contact with one another and alongside one another as a stream of objects.

According to embodiments of the invention the apparatus has a first image capturing device by means of which at least one image of a first region of this stream of objects can be captured, wherein a plurality of these objects is located in this region. In addition, an identification device is provided, with which at least a sub-region of this region can be identified in which no object and/or no container is located in the predetermined alignment.

Thus, with regard to the apparatus it is proposed that by means of optical means a sub-region is identified in which no objects are present, either because the object is not correctly aligned or has fallen over, or an empty space is actually located in this region. The transport surface can for instance be the surface of a conveyor belt.

In further preferred embodiments, at least one image evaluation device is provided which is suitable and intended for distinguishing whether an object with an alignment deviating from the predetermined alignment or an empty space is located in this sub-region.

In a further preferred apparatus there is at least one image capturing device which enables a three-dimensional image evaluation and/or an output of images with depth information (or corresponding imaging data). In addition, or alternatively an image evaluation device can be provided, which also outputs depth information on the basis of captured images, optionally using specific boundary conditions.

In the context of the image evaluation different procedures are conceivable. Thus, for example a 3D profile can be input line by line for the purpose of evaluation. Height values can also be distributed into different regions for example by means of software. Thus, for example containers which have fallen over can be detected if for instance first of all the pixels at the height of a container closure, pixels at the height of an upper container diameter and pixels at the height of the conveyor belt are viewed and/or evaluated. In this way for example gap arrays (of the pixels) at different heights can be viewed. For image processing for example algorithms, such as the Zhang-Suen algorithm or a Union-Find algorithm, can be used.

In further advantageous embodiments, the apparatus has a fault correction device or fault elimination device which eliminates correspondingly detected faults. This can be for example a fault correction device which eliminates containers which have fallen over or also fills gaps. It would also be possible that containers which have fallen over are aligned again in the stream of containers. In further advantageous embodiments, the apparatus has a control device which controls the fault elimination device at least also on the basis of data which are output by the above-mentioned image capturing device.

In further preferred embodiments, the system and in particular the fault elimination device has a gripping device which is suitable and intended for gripping containers. In this case this gripping device can grip the containers for example at the mouth. It would also be possible for the gripping device to grip the containers on the main body. This gripping device is also movable at least in a vertical direction. Thus, for example a gripping device can for example be introduced into a gap occurring in the stream of containers. In this case a movement of the gripping device is also synchronised with a transport speed of the containers, so that the gripping device is prevented from knocking against other containers during the gripping process. Furthermore, it would also be possible that the gripping device moves in sections with the transported objects. In this way a relative movement between for example a carrier of the gripping device and the transported containers does not occur in the transport direction.

In further advantageous embodiments, this fault correction device is movable and in particular is also movable transversely with respect to a transport direction of the containers.

In further advantageous embodiments, the fault correction device is synchronised with the transport device, in particular because the respectively detected sub-region moves with it. In further advantageous embodiments, it is possible that the sub-region is detected, but the further travel thereof is also detected as a function of the speed of movement of the transport device.

In further advantageous embodiments, several image capturing devices are arranged adjacent to one another transversely with respect to a transport direction of the containers. Thus, for example two or three or even several image cameras can be arranged adjacent to one another.

In further advantageous embodiments, the second image capturing device can be shifted or moved transversely with respect to the transport direction of the containers. Furthermore, it would also be possible that this second image capturing device is coupled to a gripping device for gripping the containers.

In a further advantageous method, a geometric distance between at least one element of the fault elimination device and at least one object of the plurality of objects is determined. With regard to the apparatus, particularly the fault elimination device and/or the gripping device of the fault elimination device has a distance measuring device in order to determine a geometric distance between the fault elimination device and/or the gripping device on the one hand and at least one object and in particular an object which has fallen over and/or is faulty.

This distance measuring device is selected from a group of distance measuring devices which includes reflex scanner devices, ultrasonic scanner devices, image capturing devices such as in particular 3D cameras and the like. If an image capturing device is used, this is operated with low resolution.

In further advantageous embodiments, the apparatus has a positioning device which is suitable and intended for positioning at least one element of the fault elimination device relative to at least one of the objects. Thus, for example a camera device and in particular a 2D camera device can be arranged on a gripping device. The fault elimination device is controlled on the basis of data of this 2D camera device. Thus, the 2D camera can capture imaging data of the transported objects and the positioning of the fault elimination device, for instance a gripping arm, can be controlled on the basis of these imaging data. Thus, for example a gripping arm of this fault elimination device can be moved into a precisely defined position relative to the objects.

BRIEF DESCRIPTION

Figure 2:
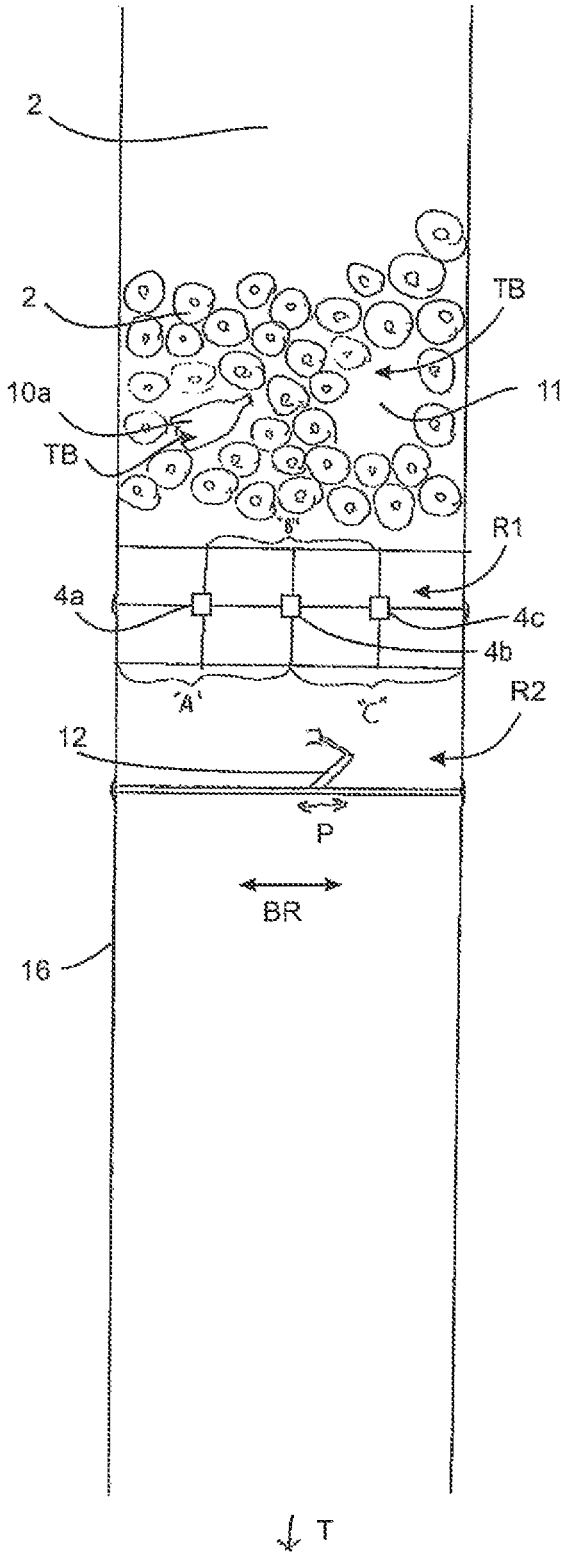

Some of the embodiments will be described in detail, with reference to the following figures, wherein like designations denote like members, wherein:

FIG. 1 shows an apparatus according to embodiments of the invention in a first embodiment; and FIG. 2 shows an apparatus according to embodiments of the invention in a second embodiment.

DETAILED DESCRIPTION

FIG. 1 shows an apparatus 1 according to embodiments of the invention in a first embodiment. This has a transport device 2 which is configured here as a conveyor belt. A plurality of containers 10 stand upright on this conveyor belt. In this case these containers each have container closures 18. This means that these containers are already closed.

The references 4a, 4b and 4c designate three image capturing devices, which here are arranged above the transport path of the containers and therefore capture images of the transported containers from above. In this case these image capturing devices 4a, 4b, 4c are arranged offset with respect to one another in a width direction BR of the transport device. In this way the entire stream of containers can be monitored by the three image capturing devices. In this case these image capturing devices have identification devices (not shown) which are suitable for identifying those regions within the stream of containers which do not contain any containers. These identification devices can therefore also be implemented as computer programs which evaluate the images captured by the image capturing devices.

For this purpose, the identification devices can search for instance with suitable evaluation mechanisms for regions within an image in which no container closures are located. In this case the image capturing device 4a can be aligned with the region A, the image capturing device 4b with the region B and the image capturing device 4c with the region C. These three regions advantageously overlap, so that it is ensured that the entire region of the bulk supply of containers is monitored. The references TB designate respectively sub-regions of the images captured by the image capturing devices in the regions A, B, C in which no upright containers are located. As shown in the drawings, this can lie on a container which has fallen over.

In addition, measuring devices (not shown) can also be provided which measure empty spaces within the stream of containers and for example supply statements about the spatial extent. These measuring devices can be configured as computer programs.

The reference 10a designates a container which has fallen over and the reference 11 designates an empty space in the bulk supply of containers. Both conditions can be understood as a malfunction or fault. The three images capturing devices 4a, 4b and 4c are arranged stationary and observe the stream of containers. In the embodiment shown in FIG. 1 it is proposed that these three images capturing devices first of all detect fault points, that is to say in this case the region in which the container 10a which has fallen over is located as well as the region in which the empty space 11 is located. However, these three images capturing devices still cannot detect what type of fault is present here. Thus, these image capturing devices in the embodiment shown in FIG. 1 or the image capturing devices shown in the region R1 constitute a rough identification of the containers or of the bulk supply of containers.

For this purpose, a second image capturing device 8 is provided immediately after the first image capturing devices 4a, 4b and 4c. This is suitable and intended for identifying the respective faults. Correspondingly the reference numeral R2 designates a fine identification region.

In this connection it is possible that the image capturing device is focused on the conveyor belt 2 itself. If for example the empty space 11 enters the region of the second image capturing device 8, these supply an immediate image of the transport device 2. In this way it can be ascertained that in the region of the fault 11 there is no container which has fallen over, but simply an empty space.

If the image capturing device detects the region of the container 10a which has fallen over, this is likewise ascertained, that is to say it is possible to identify that the fault is actually a container which has fallen over. For this purpose, as mentioned above, it would be possible for the dimensions of this empty space to be determined, and as a result in turn a conclusion can be reached as to whether a container which has fallen over is actually located in this empty space.

The reference 12 designates a fault elimination device which can be configured for example as a gripping arm which can grip the container 10a which has fallen over. This container can be removed, but it would also be possible for the container 10a to be placed upright again on the conveyor belt 2. The reference 14 designates a carrier, in contrast to which both the second image capturing device 8 and also the gripping device or fault elimination device 12 are movable in the width direction BR. However, it would also be possible for the second image capturing device 8 on the one hand and the fault elimination device 12 on the other hand to be decoupled from one another. Such a gripping arm is pivotable about at least two axes, preferred about at least three axes, about at least four axes, particularly about at least five axes and particularly about at least six axes.

The fault elimination device is configured as a robot which has a gripping element which can move in three spatial directions perpendicularly relative to one another and which is pivotable about at least one axis, about at least two axes. In this case this gripping element is movable in a predetermined region of the transport device to any position. In particular the gripping device is also movable in a longitudinal direction of the containers transported on the transport device into substantially any positions.

The reference 16 designates lateral guiding elements which delimit the transport of the containers, so that the containers are transported between the two lateral guiding elements 16.

The reference T designates the transport direction of the containers.

FIG. 2 shows a further embodiment of an apparatus 1 according to embodiments of the invention. Here too, a transport device 2 is again provided as well as containers transported thereon. However, only the first image capturing devices 4a, 4b and 4c are provided here, which directly detect not only the presence of a fault, but also the type of fault. For this purpose, the image capturing devices 4a, 4b, 4c are directly focused on the transport device 2.

Also, in the embodiment shown in FIG. 2 a fault elimination device of the type described above can again be provided. In addition, the image capturing devices 4a, 4b, 4c here can have image evaluation devices (not shown), which for instance make it possible to distinguish whether or not an empty space has been produced by a container which has fallen over.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCES

1 apparatus
2 transport device
4a, 4b, 4c image capturing device
8 second image capturing device
10 containers
10a container which has fallen over
11 empty space
12 fault elimination device
14 carrier
16 lateral guiding elements
18 container closures
R1 rough identification region
R2 fine identification region
T transport direction
BR width direction
P direction of movement
A, B, C regions captured by the image capturing device
TB sub-region

The invention claimed is:

1. A method for detecting faults in the context of transport of objects, wherein by a transport device a plurality of objects are transported in a predetermined alignment of these objects along a predetermined transport path, wherein the objects are transported while at least partially in contact with each other, and wherein the objects are located on a movable surface of the transport device, wherein by means of at least one image capturing device at least one first region is captured in which a plurality of these objects is located and at least one sub-region of this region is identified in which no object is located in the predetermined orientation, wherein furthermore a distinction is made as to whether an object with an alignment deviating from the predetermined alignment or an empty space is located in this sub-region, wherein at least one image capturing device is used which facilitates a three-dimensional image evaluation.

2. The method according to claim 1, wherein the objects are containers and a predetermined alignment of these containers is an alignment of the containers standing upright.

3. The method according to claim 1, wherein at least one object is removed from the transport path by means of a fault elimination device.

4. The method according to claim 1, wherein a geometric distance between at least one element of the fault elimination device and at least one object of the plurality of objects is determined.

5. The method according to claim 1, wherein a several regions of the stream of containers are captured by a plurality of image capturing devices which are arranged one behind the other in a direction perpendicular to the transport direction.

6. The method according to claim 1, wherein an incorrectly oriented object is at least one of removed from the stream of objects and an empty space is filled with at least one further object.

7. The method according to claim 1, wherein at least one image capturing device is aligned with a surface of the transport device.

8. The method according to claim 1, wherein by a second image capturing device which adjoins the first image capturing device in the transport direction of the objects it is checked whether an object with an alignment deviating from the predetermined alignment or an empty space is located in this region.

9. The method according to claim 8, wherein the second image capturing device is movable in a direction perpendicular to the transport direction.

10. The method according to claim 1, wherein the sub-region is determined geometrically.

11. An apparatus for detecting faults in the context of transport of objects, with a circulating transport device which has a transport surface on which the objects to be transported can be transported in a predetermined alignment rectilinearly in a predetermined transport direction, wherein the transport device has a width such that the objects can be transported at least partially in a direction perpendicular to the transport direction and at least partially in contact with one another and alongside one another as a stream of objects, wherein the apparatus has at least one first image capturing device by which at least one image of a first region of this stream of objects can be captured in which a plurality of these objects is located, and at least one identification device by which at least one sub-region of this region can be identified in which no object is located in the predetermined alignment, wherein at least one image evaluation device is provided which is suitable and intended for then distinguishing whether an object with an alignment deviating from the predetermined alignment or an empty space is located in this sub-region, wherein at least one image capturing device is used which facilitates a three-dimensional image evaluation.

12. The apparatus according to claim 11, wherein the apparatus has a fault elimination device which is suitable and intended for eliminating faults in a stream of the transported objects and the fault elimination device has a distance measuring device which is suitable and intended for determining a distance of at least one element of the fault elimination device from at least one of the transported objects.

\* \* \* \* \*